US011579293B2

(12) United States Patent
Viswanatha et al.

(10) Patent No.: US 11,579,293 B2
(45) Date of Patent: *Feb. 14, 2023

(54) TECHNIQUES FOR COMPENSATING FOR EGO-VELOCITY AND TARGET VELOCITY IN THE DIGITALLY-SAMPLED TARGET SIGNAL

(71) Applicant: AEVA, INC., Mountain View, CA (US)

(72) Inventors: Kumar Bhargav Viswanatha, Santa Clara, CA (US); Jose Krause Perin, Mountain View, CA (US); Esha John, Sunnyvale, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,750

(22) Filed: Oct. 28, 2021

(65) Prior Publication Data

US 2022/0107413 A1 Apr. 7, 2022

Related U.S. Application Data

(63) Continuation of application No. 17/335,530, filed on Jun. 1, 2021, now Pat. No. 11,163,062.

(Continued)

(51) Int. Cl.
*G01C 3/08* (2006.01)
*G01S 17/34* (2020.01)

(Continued)

(52) U.S. Cl.
CPC .............. *G01S 17/34* (2020.01); *G01S 7/497* (2013.01); *G01S 17/36* (2013.01)

(58) Field of Classification Search
CPC ........... G01S 17/34; G01S 17/36; G01S 7/497
See application file for complete search history.

(56) References Cited

U.S. PATENT DOCUMENTS 9,081,090 B2  7/2015 Sebastian et al.
10,203,401 B2  2/2019 Sebastian et al.
(Continued)

FOREIGN PATENT DOCUMENTS

DE  19501526 A1 * 7/1996 .......... G01B 9/0207
WO  2006132688 A1  12/2006
(Continued)

OTHER PUBLICATIONS

International Search Report and Written Opinion on the Patentability of Application No. PCT/US2021/054005 dated Feb. 8, 2022, 19 pages.

(Continued)

*Primary Examiner* — Mark Hellner
(74) *Attorney, Agent, or Firm* — Womble Bond Dickinson (US) LLP

(57) ABSTRACT

A method of compensation in a light detection and ranging (LIDAR) system. The method includes generating a digitally-sampled target signal. The method also includes compensating for ego-velocity and target velocity in the digitally-sampled target signal based on an estimated ego-velocity and an estimated target velocity to produce a compensated digitally-sampled target signal.

20 Claims, 11 Drawing Sheets

Related U.S. Application Data

(60) Provisional application No. 63/089,886, filed on Oct. 9, 2020, provisional application No. 63/087,432, filed on Oct. 5, 2020.

(51) Int. Cl.
  *G01S 7/497* (2006.01)
  *G01S 17/36* (2006.01)

(56) References Cited

U.S. PATENT DOCUMENTS

| | | |
|---|---|---|
| 2018/0356511 A1 | 12/2018 | Buddendick et al. |
| 2019/0310372 A1 | 10/2019 | Crouch et al. |
| 2019/0339359 A1* | 11/2019 | Wang ............... G01S 17/34 |
| 2020/0139971 A1* | 5/2020 | Bucht ............ B60W 30/18145 |
| 2020/0292706 A1 | 9/2020 | Hexsel et al. |
| 2020/0400821 A1 | 12/2020 | Baker et al. |
| 2021/0190943 A1* | 6/2021 | Hakobyan ............ G01S 13/931 |
| 2021/0215791 A1* | 7/2021 | Abari .................... G01S 7/4091 |
| 2021/0215808 A1 | 7/2021 | Abari et al. |

FOREIGN PATENT DOCUMENTS

| | | |
|---|---|---|
| WO | 2017191285 A1 | 11/2017 |
| WO | 2021020242 A1 | 2/2021 |

OTHER PUBLICATIONS

Zhenyang Ding et al.: "Compensation of Laser Frequency Tuning Nonlinearity of Long Range OFDR Using Deskew Filter", Feb. 7, 2014, 9 pages.

Barjenbruch Michael et al.: "Joint Spatial- and Doppler-Based Ego-Motion Estimation for Automotive Radars", Jun. 28, 2015, 6 pages.

* cited by examiner

TECHNIQUES FOR COMPENSATING FOR EGO-VELOCITY AND TARGET VELOCITY IN THE DIGITALLY-SAMPLED TARGET SIGNAL

RELATED APPLICATIONS

This application is a continuation of U.S. patent application Ser. No. 17/335,530 filed on Jun. 1, 2021, which claims priority from and the benefit of U.S. Patent Application No. 63/087,432 filed on Oct. 5, 2020; and U.S. Patent Application No. 63/089,886 filed on Oct. 9, 2020; the entire contents of which are incorporated herein by reference in their entirety.

FIELD OF INVENTION

The present disclosure is related to light detection and ranging (LIDAR) systems.

BACKGROUND

Conventional Frequency-Modulated Continuous-Wave (FMCW) LIDAR systems include several possible phase impairments such as laser phase noise, circuitry phase noise, flicker noise that the driving electronics inject on a laser, drift over temperature/weather, and chirp rate offsets. These impairments cause loss in probability of detection, increased false alarm, range/velocity bias and increase the error in estimated target range/velocity.

SUMMARY

The present disclosure describes various embodiments of LIDAR systems and methods that, among other things, mitigate phase impairments may be experienced by LIDAR systems. Embodiments of the present invention include the functionality to introduce a Doppler compensated phase impairment correction.

According to one aspect, the present disclosure relates to a method of compensating for phase impairments in a light detection and ranging (LIDAR) system. The method includes compensating for ego-velocity and target velocity in the digitally-sampled target signal based on an estimated ego-velocity and an estimated target velocity to produce a compensated digitally-sampled target signal. The method may also include performing a phase impairment correction on the compensated digitally-sampled target signal for transmission to a point cloud. In an embodiment, the method also includes determining the ego-velocity of the LIDAR system, wherein the ego-velocity is a velocity of the LIDAR system calculated based on neighboring objects measured using one or more motion sensors. In an embodiment, compensating for the ego-velocity and target velocity in the digitally-sampled target signal includes: applying a first frequency shift to the digitally-sampled target signal, the first frequency shift being a function of an ego-velocity of the LIDAR system; and applying a second frequency shift to the digitally-sampled target signal, the second frequency shift being a conjugate of the first frequency shift. In an embodiment, the method also includes generating a digitally-sampled reference signal using a reference beam transmitted through a fiber delay device and a second photo-detector; wherein performing the phase impairment correction on the digitally-sampled target signal includes correcting for phase impairments introduced into the digitally-sampled target signal by the LO beam and by the return signal. In an embodiment, the method also includes determining a velocity of neighboring points in a vicinity of the target; and generating the estimated target velocity based on the velocity of neighboring points. In an embodiment, determining the velocity of neighboring points includes: running a standard corrector on all neighboring points; and estimating a statistic of the velocity of neighboring points. In an embodiment, the method also includes determining a velocity of previous points of the target within a point cloud; and generating the estimated target velocity based on the velocity of previous points. In an embodiment, determining the velocity of previous points of the target within the point cloud includes determining a velocity of an immediately preceding point in a same scan line, determining a velocity of points from previous scan lines, or determining a velocity of points from previous scan-frames.

According to another aspect, the present disclosure relates to a LIDAR system including: an optical beam source to transmit a first optical beam to a target; a first photo detector to receive a return signal from the target and a LO beam and generate a digitally-sampled target signal; a fiber delay device having a known length and coupled to the optical beam source; a second detector coupled to the fiber delay device to generate a digitally-sampled reference signal using a reference beam transmitted through the fiber delay device; at least two frequency shifters to compensate for ego-velocity and target velocity in the digitally-sampled target signal based on an estimated ego-velocity and estimated target velocity; and a deskew filter to perform a phase impairment correction on the digitally-sampled target signal. In an embodiment, the ego-velocity is a velocity of the LIDAR system with respect to neighboring objects measured using one or more motion sensors. In an embodiment, the frequency shifters include: a first frequency shifter to apply a first frequency shift to the digitally-sampled target signal, the first frequency shift being a function of an ego-velocity of the LIDAR system; and a second frequency shifter to apply a second frequency shift to the digitally-sampled target signal, the second frequency shift being a conjugate of the first frequency shift. In an embodiment, the phase impairment correction on the digitally-sampled target signal corrects for phase impairments introduced into the digitally-sampled target signal by the LO beam and by the return signal. In an embodiment, the LIDAR system is also configured to determine the estimated target velocity based on a velocity of neighboring points in a vicinity of the target. In an embodiment, the LIDAR system determines the velocity of neighboring points by running a standard corrector on all neighboring points; and estimating a statistic of the velocity of neighboring points. In an embodiment, the LIDAR system is also configured to determine the estimated target velocity based on a velocity of previous points of the target within a point cloud. In an embodiment, the LIDAR system determines the velocity of previous points by determining a velocity of an immediately preceding point in a same scan line, determining a velocity of points from previous scan lines, or determining a velocity of points from previous scan-frames.

According to another aspect, the present disclosure relates to a method of compensating for phase impairments in a LIDAR system. The method includes transmitting a first optical beam to a target from the LIDAR system; receiving, at the LIDAR system, a return signal from the target at a first photo detector; generating a digitally-sampled reference signal using a reference beam transmitted through a fiber delay device and a second photo-detector; estimating one or more phase impairments in the LiDAR system using the digitally-sampled reference signal to produce one or more estimated phase impairments; applying a first frequency shift to the digitally-sampled target signal, the first frequency shift being a function of the ego-velocity of the LIDAR system and an estimated target velocity; adjusting for phase impairments in the digitally-sampled target signal for transmission to a point cloud using a deskew filter; and applying a second frequency shift to the digitally-sampled target signal, the second frequency shift being a conjugate of the first frequency shift. In an embodiment, adjusting for phase impairments in the digitally-sampled target signal includes correcting for phase impairments introduced into the digitally-sampled target signal by the LO beam and by the return signal. In an embodiment, the method also includes determining a velocity of neighboring points in a vicinity of the target; and generating the estimated target velocity based on the velocity of neighboring points. In an embodiment, the method also includes determining a velocity of previous points of the target within a point cloud; and generating the estimated target velocity based on the velocity of previous points.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for compensating for phase impairments in dynamic scenes detected by LIDAR systems. According to some embodiments, the described LIDAR system may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
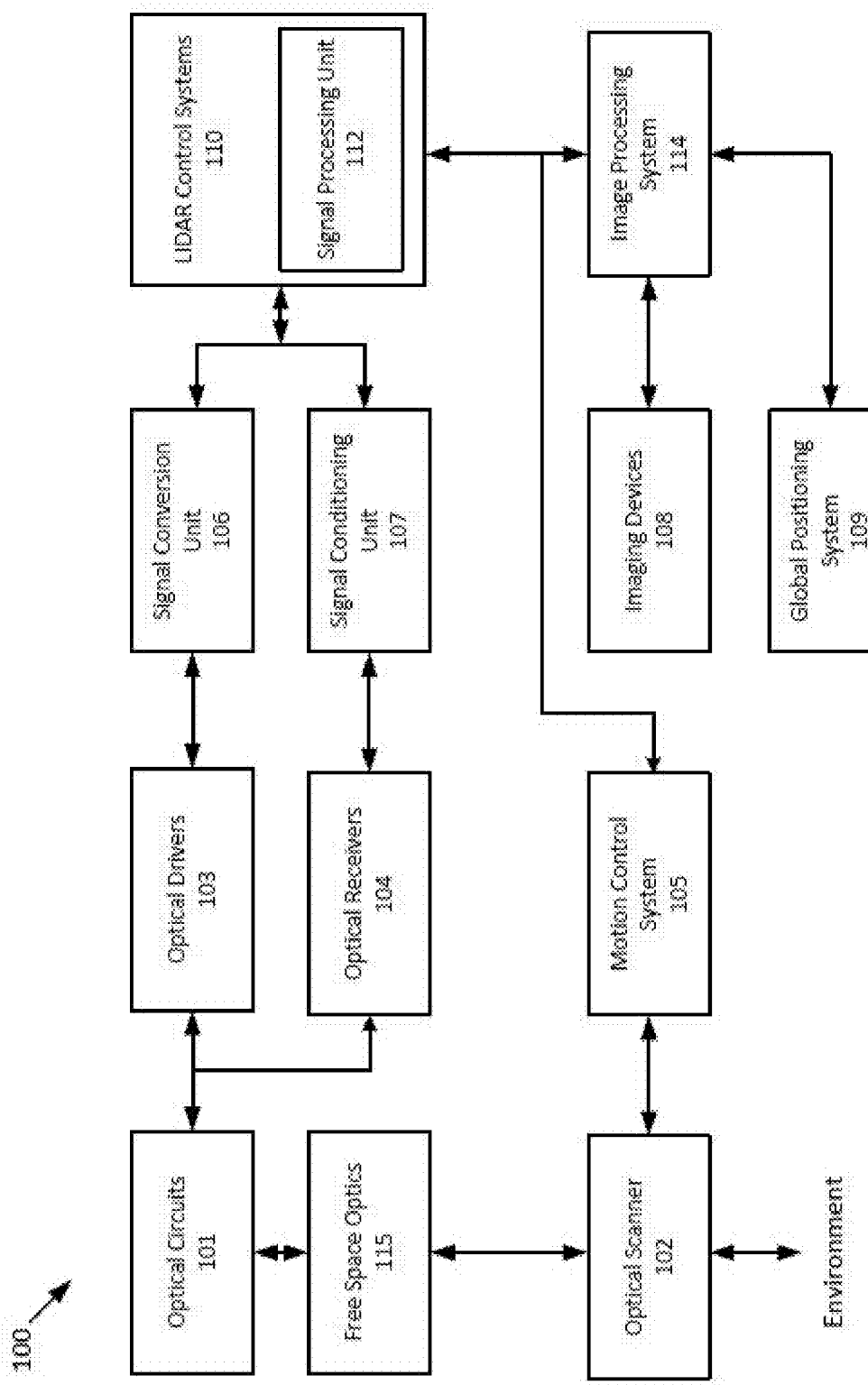
FIG. 1 illustrates an example LIDAR system according to embodiments of the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. According to some embodiments, the LIDAR system 100 includes one or more components that can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
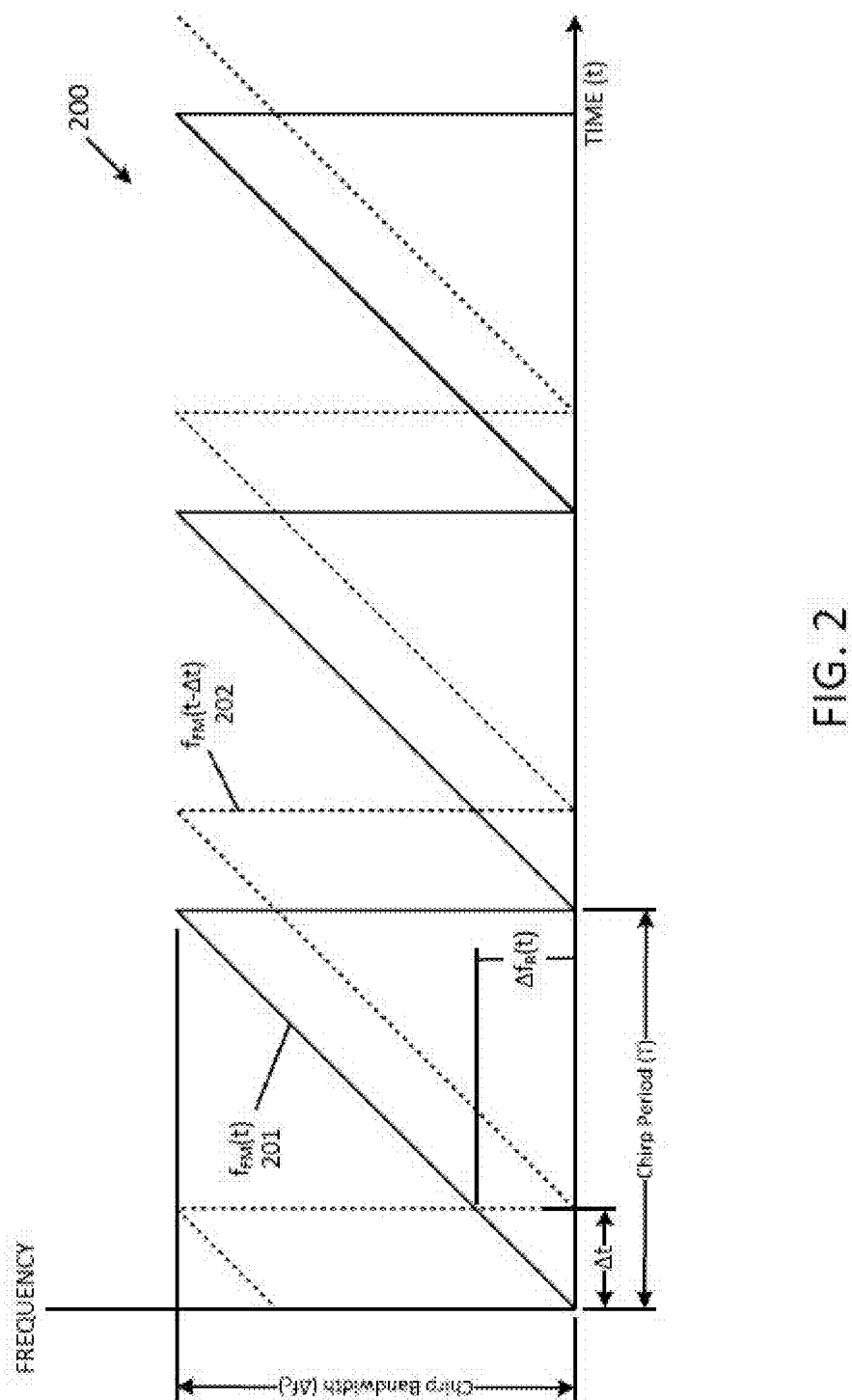
FIG. 2 is a time-frequency diagram illustrating how LIDAR waveforms are detected and processed according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as fFM(t), is a sawtooth waveform (sawtooth "chirp") with a chirp bandwidth ΔfC and a chirp period TC. The slope of the sawtooth is given as k=(ΔfC/TC). FIG. 2 also depicts target return signal 202 according to some embodiments. Target return signal 202, labeled as fFM(t−Δt), is a time-delayed version of the scanning signal 201, where Δt is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta fR(t)$ is generated. The beat frequency $\Delta fR(t)$ is linearly related to the time delay $\Delta t$ by the slope of the sawtooth k. That is, $\Delta fR(t)=k\Delta t$. Since the target range R is proportional to $\Delta t$, the target range R can be calculated as $R=(c/2)(\Delta fR(t)/k)$. That is, the range R is linearly related to the beat frequency $\Delta fR(t)$. The beat frequency $\Delta fR(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta fRmax$) is 500 megahertz. This limit in turn determines the maximum range of the system as $Rmax=(c/2)(\Delta fRmax/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

In some scenarios, there may be several sources of phase impairments experienced by LIDAR systems, such as the LIDAR system described at FIG. 1. Examples of these sources may be laser phase noise, circuitry phase noise, flicker noise that the driving electronics inject on the laser, drift over temperature/weather, or chirp rate offsets.

Figure 3A:
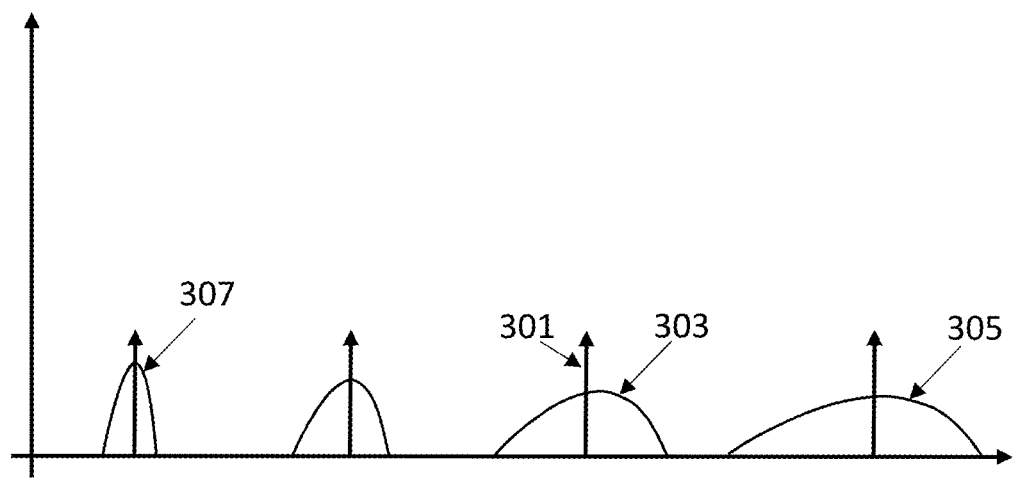
FIG. 3A illustrates phase impairments that can be mitigated by embodiments of the present disclosure.

FIG. 3A illustrates phase impairments that can be mitigated by embodiments of the present invention. A phase impairment corrected peak 301 is shown corresponding to a non-corrected peak 303. As shown in FIG. 3A, the phase impairment on the received signal depends on the range of the target. In some scenarios, targets that are further away may have a higher bandwidth of phase impairment compared to closer targets. For example, the farthest non-corrected peak 305 shown in FIG. 3A has a significantly higher bandwidth of phase impairment compared to the closer non-corrected peak 307. In some scenarios, a phase impairment may depend only on range and not on Doppler shift, whereas peak frequency may depend on both range and Doppler shift. In some embodiments, the dependency of phase impairment on range may be utilized in some correction algorithms described herein. In some embodiments, a deskew filter can be used to apply a negative group delay which may be linearly proportional to the frequency.

Figure 3B:
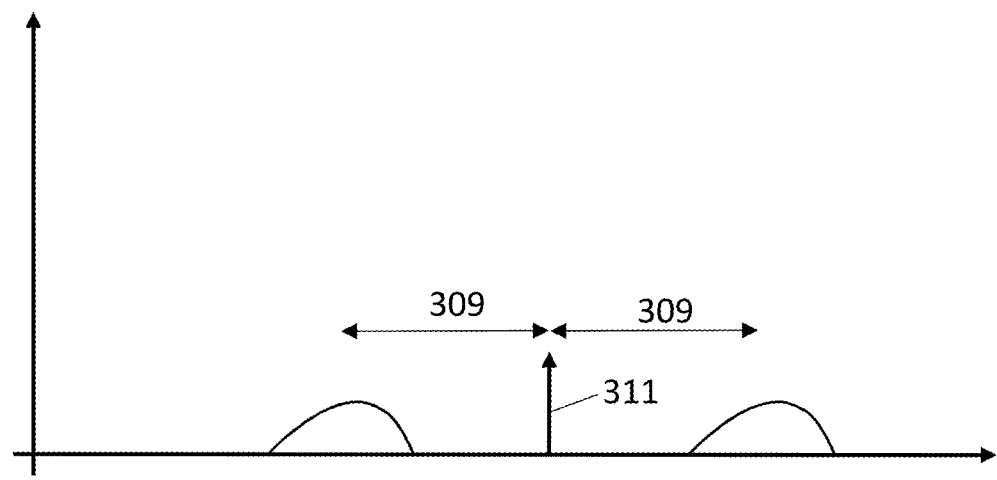
FIG. 3B illustrates dynamic scenarios in which impairments can be corrected by embodiments of the present disclosure.

FIG. 3B illustrates dynamic scenarios that can be mitigated by embodiments of the present invention. As shown in FIG. 3B, the peak frequency 311 can be calculated as frequency=alpha (times) $\Delta t$ (plus or minus) a Doppler shift 309, where alpha is the slope of the chirp (also called chirp rate). In some embodiments, a deskew filter applies negative group delay based on alpha (times) Range (plus or minus) Doppler shift instead of alpha (times) Range. This may lead to a loss in performance and a loss in probability of detection and range/velocity error on dynamic targets.

The embodiments described herein address these issues by, for example, utilizing the described ego-Doppler compensated phase impairment corrector. The ego-Doppler compensated phase impairment corrector may compensate for ego-velocity before applying a deskew filter. It should be noted that ego-velocity as described herein can include, but is not limited to, both vehicle velocity, sensor velocity, mirror velocity, and the like, or any previous ego-velocity determinations made by, or provided to, the systems described herein as well as any combination of them. As used herein, the ego-velocity can be estimated using either the point cloud, or it can be measured using one or more motions sensors, such as an inertial measurement unit (IMU).

In some embodiments, a neighborhood velocity-based phase impairment corrector can be used, as discussed in more detail below in reference to FIG. 6. A signal may be run through a deskew filter, an estimate of the true target velocity may be derived using the velocity of a subset of all detected points in the neighborhood using the standard deskew filter and then re-perform correction procedures based on a neighborhood velocity estimate.

In some embodiments, a previous-points-based phase impairment corrector can be used. The previous-points-based phase impairment corrector may use the velocity from previous estimated points to estimate the most likely velocity of the current point and apply that frequency shift before a deskew compensation. In some embodiments, immediate previous points may be used. In embodiments, points from previous scan lines may be used. In some embodiments, points from previous frames may be used.

In some embodiments, an iterative phase impairment corrector and/or a multi-Doppler compensated phase impairment corrector can be used. In some embodiments, Doppler compensation may be applied to any of the described techniques on either target ADC samples or on deskew filter coefficients.

Figure 4:
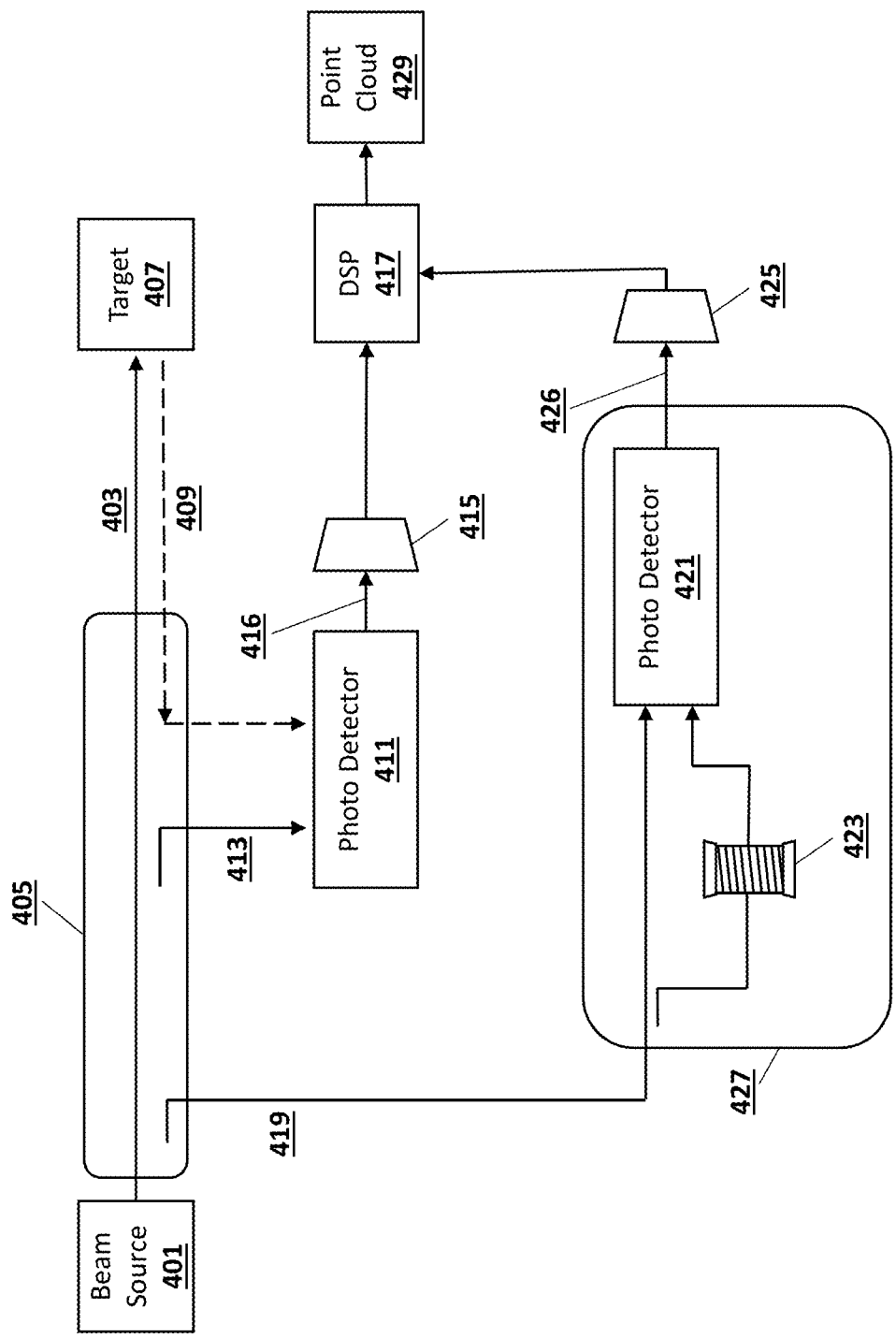
FIG. 4 is a block diagram of an example LIDAR system with a reference arm, according to embodiments of the present disclosure.

FIG. 4 is a block diagram of an example LIDAR system with a reference arm 427, according to embodiments of the present disclosure. As shown in FIG. 4, according to some embodiments, one or more reference arms 427 can be added to a LIDAR system to generate a digitally-sampled reference signal 426 that can be used to estimate the phase impairment in transmitted signals. For instance, in one embodiment, one or more reference arms 427 can be included as part of optical circuits 101, signal conversion unit 106, and/or signal conversion unit 107 in FIG. 1. In this example embodiment, the system includes a beam source 401, such as a FMCW laser source. The target arm 405 includes a number of optical components (e.g. lenses or filters) through which the scanning signal 403 can pass on its way to a target 407. The return signal 409 can be reflected from the target 407 and directed to a photo detector 411. In this embodiment, a local oscillator (LO) signal 413, which is a portion of the scanning signal 403, is directed to the photo detector 411 before being sent out to the target 407. From the photo detector 411, a digitally-sampled target signal 416 then passes to a target ADC 415, and then to the DSP 417.

As depicted in this embodiment, the reference arm 427 receives a signal portion 419 of the scanning signal 403, which can be provided to a photo detector 421 directly, and also after passing through a delay device 423 having a known length. According to some embodiments, signal portion 419 is received by photo detector 421 as scanning signal 403 is transmitted contemporaneously through the optical components of target arm 405. According to some embodiments, signal portion 419 is received by photo detector 421 after scanning signal 403 is transmitted through the optical components of target arm 405. According to some embodiments, delay device 423 can be a fiber delay device, etc. In one embodiment, the delay device 423 can include a fiber coil with a known length that can create a virtual target (e.g., fiber target) at a known distance.

In some scenarios, the virtual target's distance can be pre-determined. The optical signal at the output of the reference delay has the same characteristics as the target return signal 202 depicted in FIG. 2. According to some embodiments, in a manner similar to that described in FIG. 2, the virtual target can produce a return signal 409 that is a time-delayed version of scanning signal 403. When the return signal 409 is optically mixed with the scanning signal 603, a reference range dependent difference frequency ("reference beat frequency") is generated. According to some embodiments, the reference beat frequency can then be digitized and conditioned using the procedures described herein, for example, in FIG. 1. This reference signal has the same signature of phase impairment as the reference signal from the target. A phase impairment estimator, based at least in part on the reference signal produced by reference arm 427 and a phase impairments corrector can compensate for phase impairments in signals transmitted towards a target (i.e., "target" signals) and signals received therefrom (i.e., "received" signals).

From the photo detector 421, the digitally-sampled reference signal 426 then passes to a reference ADC 425 and then to the DSP 417. As shown in FIG. 4, embodiments of the present invention can produce point cloud data 429 based on the transmission and receipt of various signals, including the return signal 409 from a target, a LO signal 413, and a reference arm 427.

Figure 5:
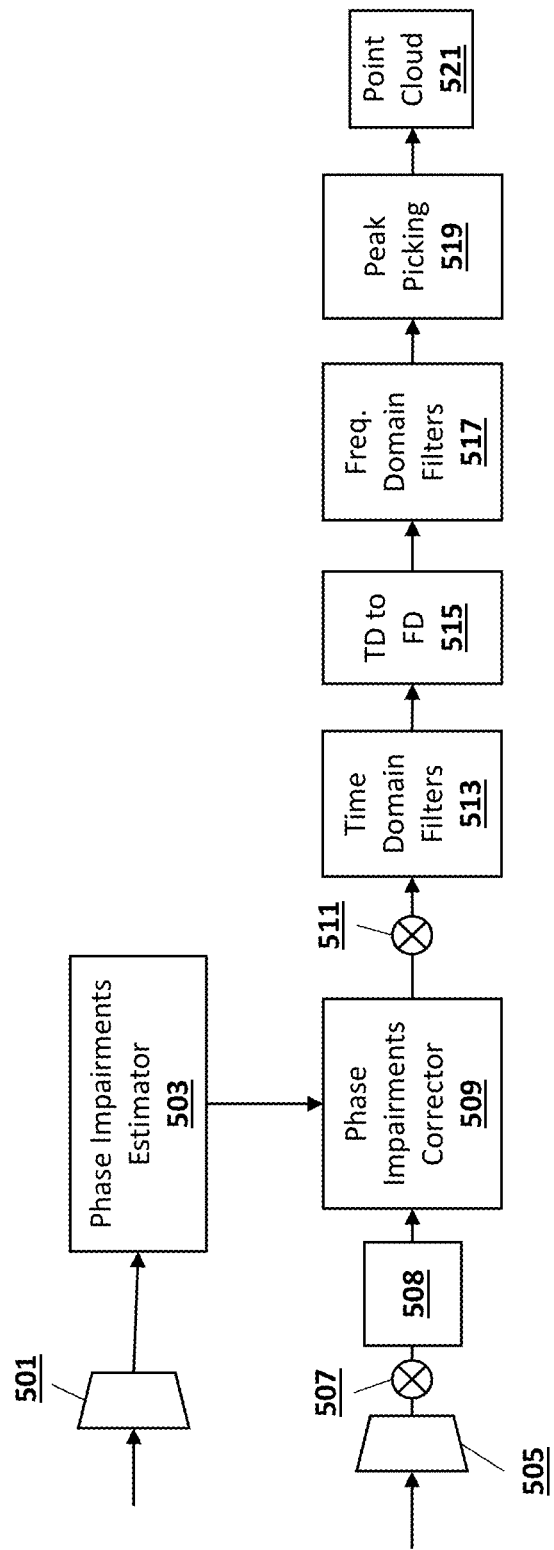
FIG. 5 illustrates an ego-Doppler compensated corrector in accordance with embodiments of the present disclosure.

FIG. 5 illustrates an ego-Doppler compensated corrector in accordance with embodiments of the present invention. As depicted in FIG. 5, the phase impairments corrector 509 is configured with an ego-Doppler compensated corrector configured to compensate for an estimated or measured ego-Doppler by introducing a frequency shift provided, by a frequency shifter 507, on the received signal before running a deskew filter 508 and undoing the frequency shift at frequency shifter 511 after a phase impairment correction. In some embodiments, the ego-Doppler compensated corrector can be applied to static targets in a given scene.

As shown in FIG. 5, a phase impairments estimator 503, a phase impairments corrector 509, along with one or more reference ADCs 501 and target ADCs 505 can correspond to the DSP 417 of FIG. 4, in some embodiments. According to one embodiment, one or more of phase impairments estimator 503 and/or phase impairments corrector 509 can be included as part of signal processing unit 112 in FIG. 1. In some embodiments, the architecture also includes time domain filters 513, time domain (TD) to frequency domain (FD) converters 515, frequency domain filters 517, and peak picking components 519. The digital signal processing architecture can generate and process data such as point cloud data 521. It should be appreciated that, although the use of point clouds are described herein, embodiments are not limited to such and may include, but are not limited to, point sets.

Figure 6:
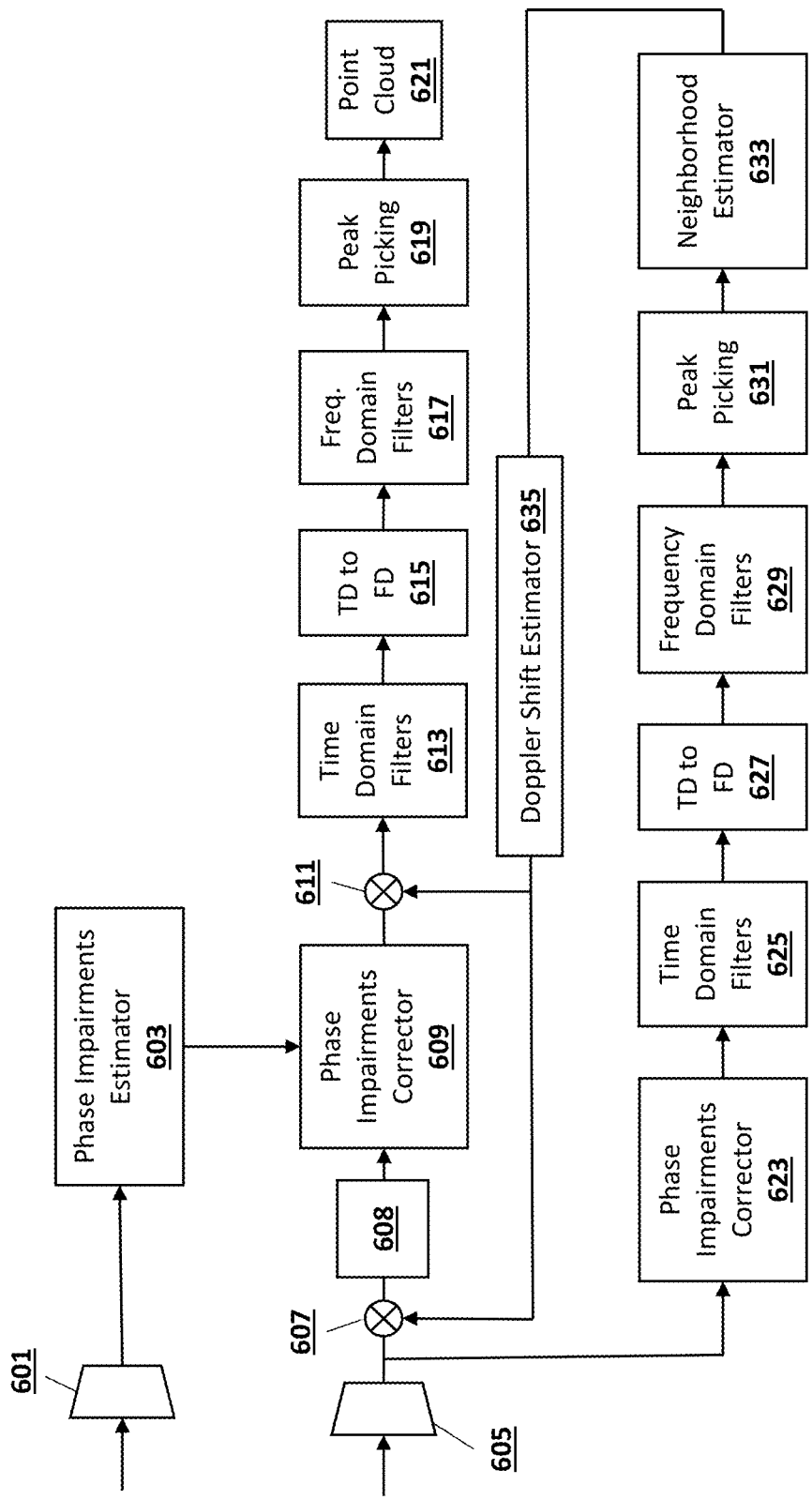
FIG. 6 illustrates a neighborhood velocity based corrector in accordance with embodiments of the present disclosure.

FIG. 6 illustrates a neighborhood velocity-based corrector used by a phase impairments corrector in accordance with embodiments of the present invention. As shown in FIG. 6, phase impairments corrector 609 is configured with a neighborhood velocity-based corrector that runs a phase impairments corrector 623 on a subset of all points and estimates velocity based on neighborhood points using a neighborhood estimator 633. In some embodiments, the estimate can be the mean/median or any other statistic of the velocity of neighboring points. In alternative embodiments, the neighborhood velocity-based corrector may compensate for estimated Doppler shift and rerun the phase impairment corrector to re-estimate the peaks.

Once the neighborhood velocity has been estimated, an estimated Doppler shift can be calculated by a Doppler shift estimator 635, and an associated frequency shift introduced at frequency shifter 607 before the deskew filter 608 and phase impairments corrector 609. As described above, a deskew filter 608 applies a variable delay based on frequency, so an adjustment to the frequency introduced at frequency shifter 607 impacts the delay applied by the deskew filter 608. In some embodiments, the second frequency shift applied at frequency shifter 611 is a conjugate of the first frequency shift introduced at frequency shifter 607.

As shown in FIG. 6, the digital signal processing architecture includes a phase impairments estimator 603, a phase impairments corrector 609, along with one or more reference ADCs 601 and target ADCs 605. In some embodiments, the neighborhood velocity estimator arm also includes time domain filters 625, TD to FD converters 627, frequency domain filters 629, and peak picking components 631. Similarly, the architecture of the target arm can also include time domain filters 613, TD to FD converters 615, frequency domain filters 617, and peak picking components 619. The digital signal processing architecture can generate and process data such as point cloud data 621.

Figure 7:
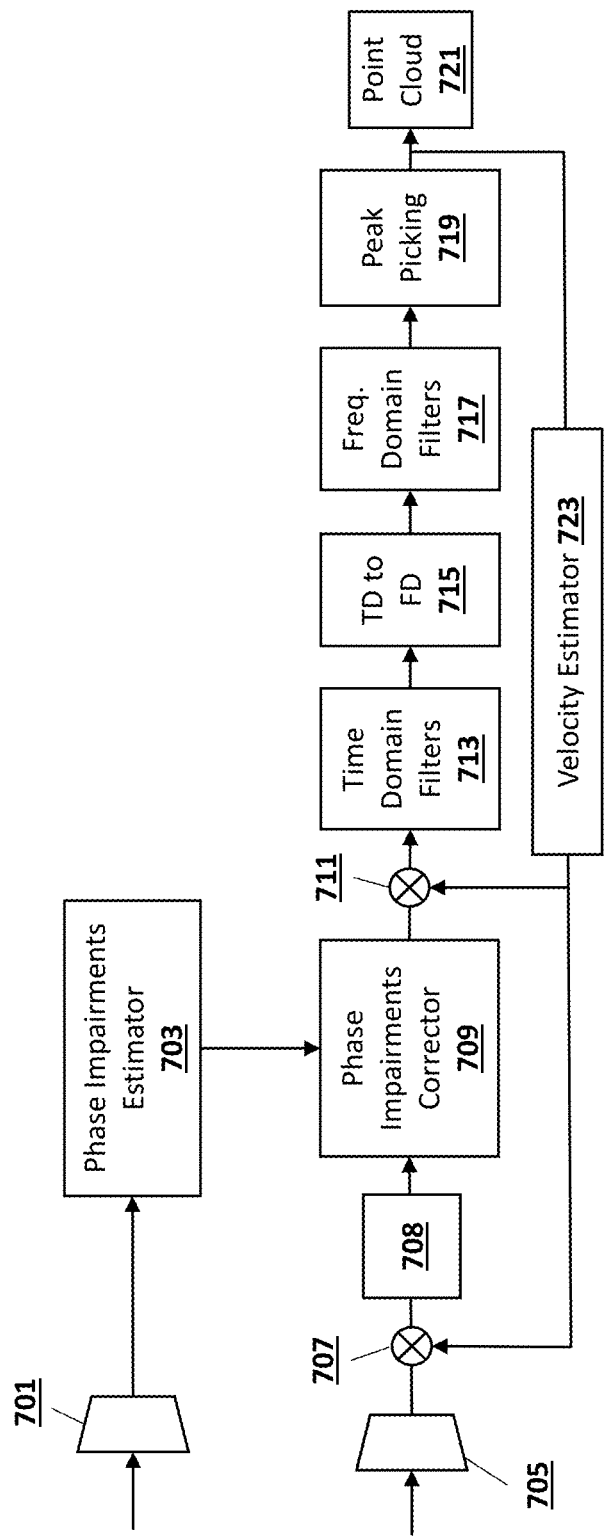
FIG. 7 illustrates a previous points based corrector in accordance with embodiments of the present disclosure.

FIG. 7 illustrates a previous-points-based corrector in accordance with embodiments of the present invention. As shown in FIG. 7, the phase impairments corrector 709 is configured with a previous-points-based corrector that is configured to estimate the velocity of a point based on previously estimated points. In some embodiments, immediate previous points may be used. In some embodiments, points from previous scan lines may be used. In embodiments, points from previous frames may be used. The previous-points-based corrector may be used to estimate velocity to compensate for Doppler shift prior to the phase impairment corrector.

As shown in FIG. 7, the digital signal processing architecture includes a phase impairments estimator 703, a phase impairments corrector 709, along with one or more reference ADCs 701 and target ADCs 705. In some embodiments, the architecture of the target arm can also include time-domain filters 713, TD to FD converters 715, frequency-domain filters 717, and peak picking components 719. The digital signal processing architecture can generate and process data such as point cloud data 721. In this example embodiment, after peak picking 719, a velocity estimator 723 estimates the velocity of the previous points, as described above. Based on this velocity estimation, an associated frequency shift can be introduced at 707 before the deskew filter 708 and phase impairments corrector 709. As described above, a deskew filter 708 applies a variable delay based on frequency, so an adjustment to the frequency introduced at frequency shifter 707 impacts the delay applied by the deskew filter 708. In some embodiments, the second frequency shift applied at frequency shifter 711 is a conjugate of the first frequency shift introduced at frequency shifter 707.

Figure 8:
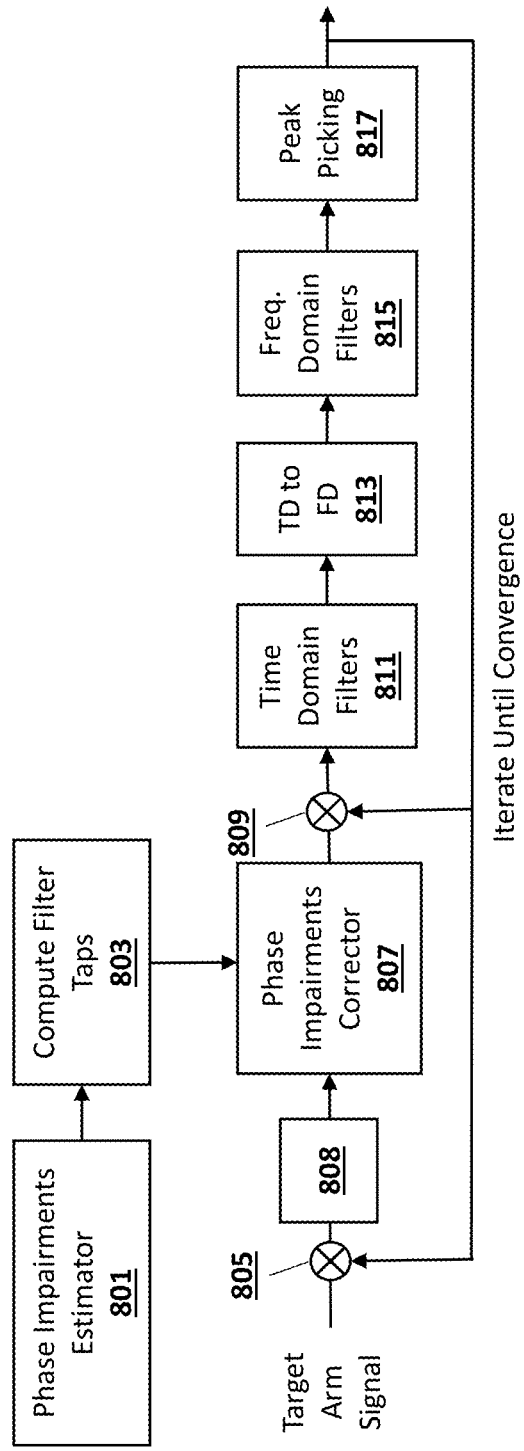
FIG. 8 illustrates an iterative phase impairment corrector in accordance with embodiments of the present disclosure.

FIG. 8 illustrates an iterative phase impairment corrector in accordance with embodiments of the present invention. As shown in FIG. 8, phase impairments corrector 807 is configured with an iterative phase impairment corrector may iterate through a loop multiple times until convergence. As shown in FIG. 8, the digital signal processing architecture includes a phase impairments estimator 801, computation of filter taps 803, and a phase impairments corrector 807. In some embodiments, the architecture of the target arm can also include time domain filters 811, TD to FD converters 813, frequency domain filters 815, and peak picking components 817.

In this example embodiment, a first frequency shift is introduced at frequency shifter 805 before a deskew filter 808 and the phase impairments corrector 807. A second frequency shift can be introduced at frequency shifter 809, and the second frequency shift can be a conjugate of the first frequency shift from frequency shifter 805. In this example embodiment, after peak picking 817, the process is iterated with a different frequency shift introduced at frequency shifter 805 and frequency shifter 809 until convergence is achieved. For each iteration, a velocity estimate from the previous iteration is used to apply a frequency shift. Thus, for each iteration, the selected peaks and the corresponding range and velocity estimates could be different. Convergence can be achieved if the selected peaks are the same over two or more consecutive iterations.

Figure 9:
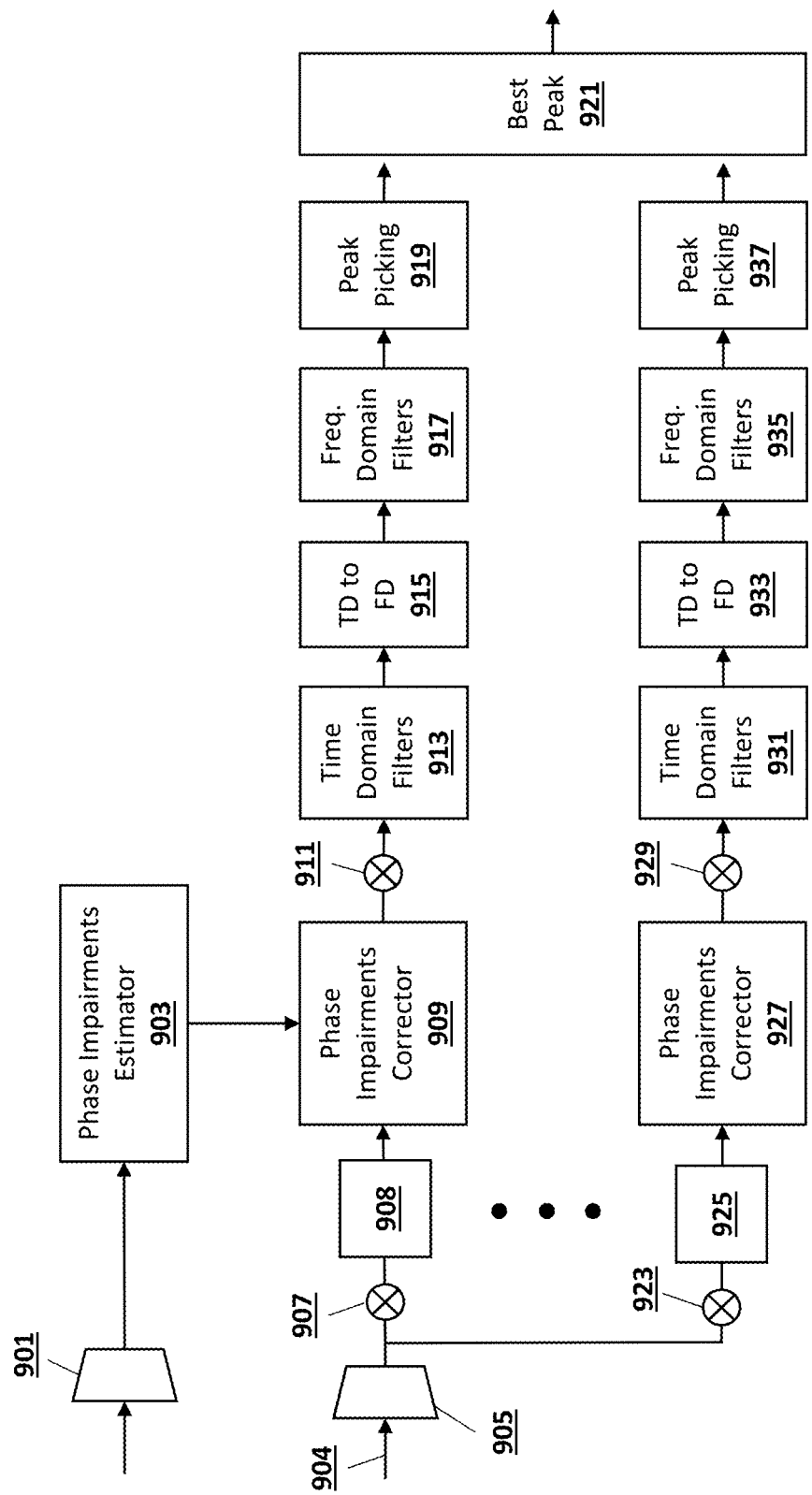
FIG. 9 illustrates a multi-Doppler compensated corrector in accordance with embodiments of the present disclosure.

FIG. 9 illustrates a multi-Doppler compensated corrector in accordance with embodiments of the present invention. As shown in FIG. 9, phase impairments correctors 909, 927 are each configured with a multi-Doppler compensated corrector that performs phase impairment correction for a number (N) of different Doppler compensated received signals and pick the best.

As shown in FIG. 9, the digital signal processing architecture includes a phase impairments estimator 703, a number of phase impairments correctors 909, 927, along with one or more reference ADCs 901 and target ADCs 905. In this particular embodiment, the received signal 904 is diverted to a number of different paths, where each path includes a different frequency shift. For example, a first frequency shift can be introduced at frequency shifter 907 ahead of the first deskew filter 908 and the first phase impairments corrector 909. After the first phase impairments corrector 909, the frequency shift introduced at frequency shifter 907 can be reversed at frequency shifter 911. In some embodiments, this first target arm can also include time-domain filters 913, TD to FD converters 915, frequency-domain filters 917, and peak picking components 919. Similarly, the Nth target arm can include a Nth frequency shift introduced at frequency shifter 923 ahead of the Nth deskew filter 925 and the Nth phase impairments corrector 927. After the Nth phase impairments corrector 927, the frequency shift introduced at frequency shifter 923 can be reversed at frequency shifter 929. In some embodiments, the Nth target arm can also include time domain filters 931, TD to FD converters 933, frequency-domain filters 935, and peak picking components 937. Finally, once a peak has been picked for each of the several delays, the best peak can be chosen at 921. Selecting the optimal peak may include, in some embodiments, picking the strongest peak, the highest SNR, or other metrics that are used for signal detection.

Figure 10:
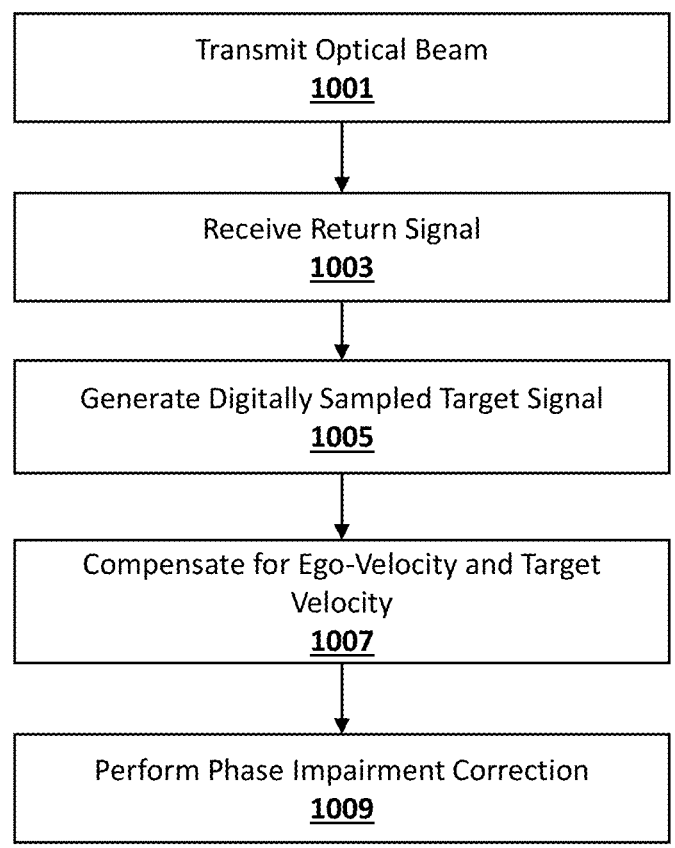
FIG. 10 is a flow diagram of an example method of compensating for phase impairments within a LIDAR system, according to an embodiment of the present disclosure.

FIG. 10 is a flow diagram of an example method of compensating for phase impairments within a LIDAR system, according to an embodiment of the present disclosure. The method begins at operation 1001 by transmitting a first optical beam to a target. The first optical beam can include, for example, a FMWC beam. In an embodiment, the optical beam can be transmitted from a beam source 401.

At operation 1003, a return signal 409 is received from the target at a first detector. The first detector that receives the return signal 409 may be the photo detector 411 discussed above in reference to FIG. 4.

At operation 1005, a digitally-sampled target signal 416 is generated using a local oscillator (LO) beam 413, a photo detector 411, and the return signal 409.

At operation 1007, the ego-velocity and target velocity is compensated for in the digitally-sampled target signal 416 based on an estimated ego-velocity and an estimated target velocity. This compensation can be performed, in some embodiments, using frequency shifters 507, 511, 607, 611, 707, 711, 805, 809, 907, 911, 923, 929. In one embodiment, a first frequency shift can be applied to the digitally-sampled target signal, where the first frequency shift is a function of the ego-velocity of the LIDAR system and an estimated target velocity. A second frequency shift can be applied to the digitally-sampled target signal that is a conjugate of the first frequency shift. In some embodiments, the estimated target velocity is based on the velocity of neighboring points, and the velocity of neighboring points can be determined by running a standard corrector on all neighboring points and estimating a statistic (e.g., mean or median) of the velocity of neighboring points. In other embodiments, the estimated target velocity is based on the velocity of previous points.

At operation 1009, a phase impairment correction is performed on the digitally-sampled target signal using a phase impairments corrector 509, 609, 709, 807, 909, 927. In some embodiments, the method also includes generating a digitally-sampled reference signal using a reference beam transmitted through a fiber delay device having a known length. The phase impairment correction can correct phase impairments introduced into the digitally-sampled target signal by the LO beam and by the return signal. In such an embodiment, the reference beam can be split from the first optical beam using a beam splitter. In some embodiments, adjusting for the phase impairments in the return signal includes introducing a delay to the return signal based on a frequency of the return signal. Such a delay can be proportional to the frequency of the return signal, such that reflections from targets at a larger distance are delayed more, and reflections from targets at a shorter distance are delayed less. This delay can be introduced using, for example, a deskew filter 508, 608, 708, 808, 908, 925.

Figure 11:
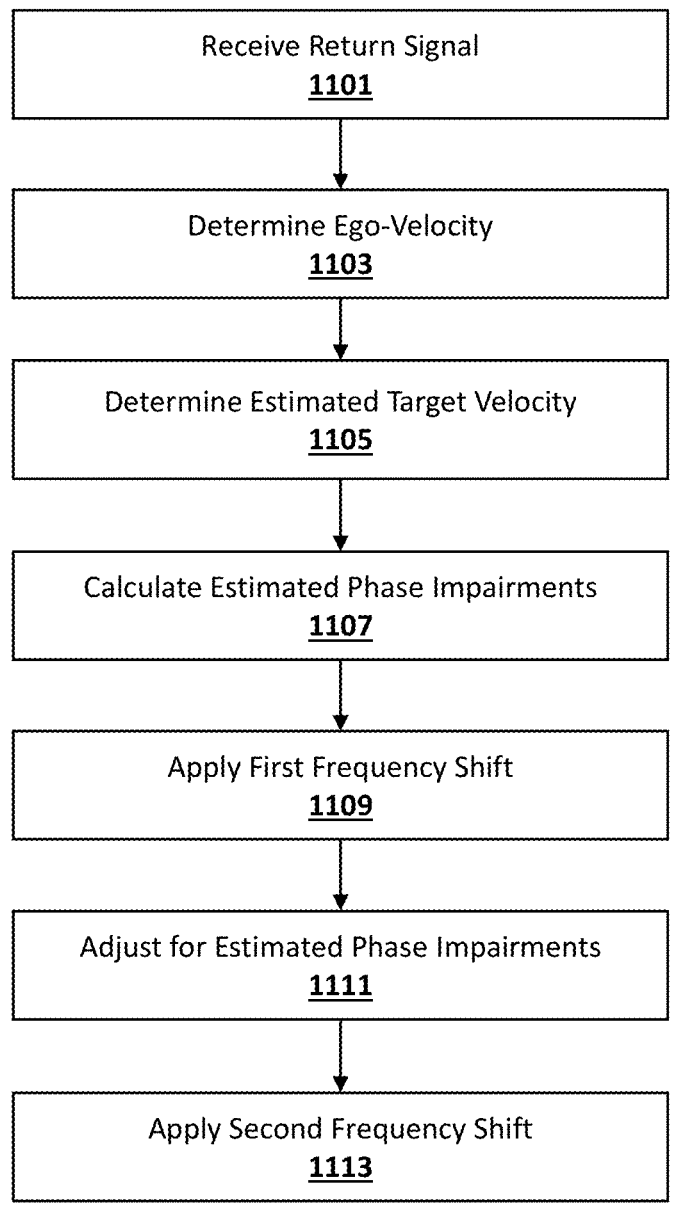
FIG. 11 is a flow diagram of another example method of compensating for phase impairments within a LIDAR system, according to an embodiment of the present disclosure.

FIG. 11 is a flow diagram of another example method of compensating for phase impairments within a LIDAR system, according to an embodiment of the present disclosure. The method begins at operation 1101 by receiving a return signal 409 reflected from a target 407 at a LIDAR system. The return signal 409 is a reflection of a first optical beam 403 transmitted from the LIDAR system. The optical beam 403 can be transmitted using a beam source 401, in some embodiments.

At operation 1103, the method determines an ego-velocity of the LIDAR system. In some embodiments, the ego-velocity is a velocity of the LIDAR system with respect to neighboring objects. The ego-velocity can also include the velocity of a mirror associated with the LIDAR system. In some embodiments, the ego-velocity of the LIDAR system can be determined, for example, using the signal processing unit 112 or the motion control system 105, described in reference to FIG. 1.

At operation 1105, the method determines an estimated target velocity. In some embodiments, determining the estimated target velocity includes determining the velocity of neighboring points in the vicinity of the target; and generating the estimated target velocity based on the velocity of neighboring points. In some embodiments, estimating the velocity of neighboring points includes running a standard corrector on all neighboring points; and estimating a statistic (e.g., mean or median) of the velocity of neighboring points. In alternative embodiments, determining the estimated target velocity includes determining the velocity of previous points of the target within a point cloud, and generating the estimated target velocity based on the velocity of the previous points. In some embodiments, the previous points can include an immediately preceding point in the same scan line, or the velocity of points from previous scan lines or previous scan-frames. In some embodiments, the estimated target velocity can be determined, for example, using the signal processing unit 112 or the image processing system 114, described in reference to FIG. 1.

At operation 1107, an estimated phase impairment is calculated using a phase impairments estimator 503, 603, 703, 801, 903. At operation 1109, a first frequency shift is applied to the return signal. In some embodiments, the first frequency shift is a function of the ego-velocity of the LIDAR system. In some embodiments, the first frequency shift is a function of the estimated target velocity determined at operation 1105.

Once the first frequency shift has been applied, the return signal is adjusted at operation 1111 to account for phase impairments, based on the estimated phase impairment. In some embodiments, adjusting for the phase impairments in the return signal includes introducing a delay to the return signal based on a frequency of the return signal. Such a delay can be proportional to the frequency of the return signal, such that reflections from targets at a larger distance are delayed more, and reflections from targets at a shorter distance are delayed less. This delay can be introduced using, for example, a deskew filter 508, 608, 708, 808, 908, 925.

At operation 1113, a second frequency shift is applied to the delayed beam from the deskew filter. In some embodiments, the second frequency shift is a conjugate of the first frequency shift. The frequency shifts performed at operations 1109 and 1113 can be performed, for example, using frequency shifters 507, 511, 607, 611, 707, 711, 805, 809, 907, 911, 923, 929.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

The term "coupled," along with its derivatives, is used to indicate that two or more elements interact with each other. These coupled elements may or may not be in direct physical or electrical contact with each other.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of compensation in a light detection and ranging (LIDAR) system comprising:
   generating a digitally-sampled target signal; and
   compensating for ego-velocity and target velocity in the digitally-sampled target signal based on an estimated ego-velocity and an estimated target velocity to produce a compensated digitally-sampled target signal, wherein the ego-velocity comprises a velocity of the LIDAR system with respect to one or more objects positioned relative to the LIDAR system.

2. The method of claim 1, further comprising:
   performing a phase impairment correction on the compensated digitally-sampled target signal for transmission to a point cloud.

3. The method of claim 1, further comprising:
   transmitting a first optical beam towards a target; and
   receiving, based on the first optical beam, a second optical beam from the target to produce a return signal.

4. The method of claim 3, wherein generating the digitally-sampled target signal is performed using a local oscillator (LO) beam, a first photo-detector, and the return signal.

5. The method of claim 1, further comprising:
determining the ego-velocity of the LIDAR system, wherein the ego-velocity is a velocity of the LIDAR system calculated based on neighboring objects measured using one or more motion sensors.

6. The method of claim 1, wherein compensating for the ego-velocity and target velocity in the digitally-sampled target signal further comprises:
applying a first frequency shift to the digitally-sampled target signal, the first frequency shift being a function of an ego-velocity of the LIDAR system; and
applying a second frequency shift to the digitally-sampled target signal, the second frequency shift being a conjugate of the first frequency shift.

7. The method of claim 1, further comprising:
determining a velocity of neighboring points in a vicinity of a target; and
generating the estimated target velocity based on the velocity of neighboring points.

8. The method of claim 2, further comprising:
determining a velocity of previous points of the target within a point cloud; and
generating the estimated target velocity based on the velocity of previous points.

9. A light detection and ranging (LIDAR) system comprising:
an optical source to transmit an optical beam toward a target;
an optical detector to generate a digitally-sampled target signal from a reflection of the optical beam from the target;
at least two frequency shifters to compensate for ego-velocity and target velocity in the digitally-sampled target signal based on an estimated ego-velocity and estimated target velocity, wherein the ego-velocity comprises a velocity of the LIDAR system with respect to one or more objects positioned relative to the LIDAR system; and
a deskew filter to perform a phase impairment correction on the digitally-sampled target signal.

10. The system of claim 9, further comprising:
an optical beam source to transmit a first optical beam to a target; and
a first photo detector to receive a return signal from the target and a local oscillator (LO) beam and generate the digitally-sampled target signal.

11. The system of claim 10, further comprising:
a fiber delay device having a known length; and
a second detector coupled to the fiber delay device to generate a digitally-sampled reference signal using a reference beam transmitted through the fiber delay device.

12. The system of claim 9, wherein the ego-velocity is a velocity of the LIDAR system with respect to neighboring objects measured using one or more motion sensors.

13. The system of claim 9, wherein the at least two frequency shifters comprise:
a first frequency shifter to apply a first frequency shift to the digitally-sampled target signal, the first frequency shift being a function of an ego-velocity of the LIDAR system; and
a second frequency shifter to apply a second frequency shift to the digitally-sampled target signal, the second frequency shift being a conjugate of the first frequency shift.

14. The system of claim 9, wherein the phase impairment correction on the digitally-sampled target signal corrects for phase impairments introduced into the digitally-sampled target signal.

15. The system of claim 9, wherein the LIDAR system is further configured to determine the estimated target velocity based on a velocity of neighboring points in a vicinity of a target.

16. The system of claim 9, wherein the LIDAR system is further configured to determine the estimated target velocity based on a velocity of previous points of the target within a point cloud.

17. A method of compensation in a light detection and ranging (LIDAR) system comprising:
applying a first frequency shift to a digitally-sampled target signal, the first frequency shift being a function of an ego-velocity of the LIDAR system and an estimated target velocity;
adjusting for phase impairments in the digitally-sampled target signal for transmission to a point cloud; and
applying a second frequency shift to the digitally-sampled target signal, the second frequency shift being a conjugate of the first frequency shift.

18. The method of claim 17, further comprising estimating the phase impairments in the using a digitally-sampled reference signal.

19. The method of claim 18, further comprising:
determining a velocity of neighboring points in a vicinity of a target; and
generating the estimated target velocity based on the velocity of neighboring points.

20. The method of claim 17, further comprising:
determining a velocity of previous points of a target within the point cloud; and
generating the estimated target velocity based on the velocity of previous points.

* * * * *